United States Patent [19]

Copeland et al.

[11] 4,426,362

[45] Jan. 17, 1984

[54] SOLID BLOCK DETERGENT DISPENSER

[75] Inventors: James L. Copeland, Richfield; Peter J. Fernholz, Burnsville; Spencer B. Larson, Newport; Duane L. Salmonson, Cottage Grove; Michael D. Weick, Eden Prairie, all of Minn.

[73] Assignee: Economics Laboratory, Inc., Saint Paul, Minn.

[21] Appl. No.: 301,746

[22] Filed: Sep. 14, 1981

Related U.S. Application Data

[63] Continuation of Ser. No. 211,411, Nov. 25, 1980, abandoned, which is a continuation of Ser. No. 966,620, Dec. 5, 1978, abandoned.

[51] Int. Cl.[3] .............................................. B01D 12/00

[52] U.S. Cl. .................................... 422/263; 422/264; 422/266; 422/274; 422/277

[58] Field of Search .................. 137/268; 222/185, 67; 128/213 R; 422/263, 264, 266, 274, 277

[56] References Cited

U.S. PATENT DOCUMENTS 2,686,080 8/1954 Wood .................................. 137/268

4,063,663 12/1977 Larson .................................. 222/67

*Primary Examiner*—Frank Sever

*Attorney, Agent, or Firm*—Merchant & Gould

[57] ABSTRACT

A detergent dispenser (20) for efficiently converting one or more solid block detergent compositions into concentrated detergent solutions is disclosed. A housing (12) configured for mounting to a solid surface defines a substantially enclosed inner cavity (30), and access and discharge ports (32) and (34) opening into the inner cavity. Retaining means (40) holds a charge of solid block detergent composition (100–103), which may include a plurality of different and even chemically incompatible detergent composition components, in fixed predetermined position within the inner cavity, exposing at least one broad surface (**100*a*) of the detergent block. Nozzle means (61) projects into the cavity and directs a pressurized liquid spray against substantially the entire exposed detergent surface(s), dissolving a portion thereof, which is collected by the housing (30*b*) and passes through the discharge port. The nozzle means may be disposed above or below the exposed detergent surface. One embodiment of the retaining means comprises a disposable or rechargable cartridge receptacle member which is removably insertable into the inner cavity through the access port. The cartridge receptacle may include an overlying screen member (50), and may be configured to define a plurality of different receptacles (46, 47). Closure means (44) and safety switching means (70, 72**) cooperably prevent hazardous spray from leaving the inner cavity.

25 Claims, 10 Drawing Figures

SOLID BLOCK DETERGENT DISPENSER

This is a continuation of application Ser. No. 211,411, filed Nov. 25, 1980, which was a continuation of application Ser. No. 966,620, filed Dec. 5, 1978, both now abandoned.

TECHNICAL FIELD

This invention relates broadly to dispensing apparatus. More particularly, this invention relates to detergent dispenser apparatus which converts solid block-type detergent compositions into concentrated detergent solution, which is particularly useful for institutional dishwashing and fabric washing machines.

CROSS-REFERENCE TO RELATED APPLICATION

This application is related to U.S. patent application entitled Cast Detergent-Containing Article and Method of Making and Using by Peter J. Fernhole, et al, Ser. No. 875,784, filed on Feb. 7, 1978 and owned by the common assignee of this application.

BACKGROUND OF PRIOR ART

Automated institutional and industrial spray washing machines are generally configured to embody at least one wash tank or reservoir for maintaining a readily available supply of detergent solution for use by the washing machine. During operation, the washing machine repeatedly draws upon or reuses the detergent solution within the wash tank reservoir, over a period of time (e.g. such as over an entire day), until it is replenished by a fresh solution. During normal useage a part or all of the rinse water is diverted to the wash tank reservoir and a certain amount of the detergent solution is drained off via a stand pipe (for example, in ware-washing applications, with food particles and grease), to keep the remaining solution as clean as possible. The proper reservoir solution level may also be maintained by adding water to the reservoir, which reduces or dilutes the detergent concentration of the reservoir solution. Accordingly, to maintain the reservoir solution at the desired detergent concentration level required for proper cleaning, concentrated detergent solution is periodically added to the reservoir by auxiliary detergent dispenser apparatus.

In commercial institutional and industrial washing applications, it is advantageous, from time, cost and safety considerations for operators to be required to only periodically change the washing machine (or its detergent dispenser) with its required detergent—say, for example, only once during the normal working day. Accordingly, the detergent dispenser apparatus used for replenishing the wash tank solution have typically been designed to hold sizable amounts of detergent, and for automatic or semi-automatic operation. Such use of automated detergent dispensers eliminates the need of constant operator attention to the status of the reservoir solution, minimizes operator errors due to operator misjudgment in timing or in the amount of detergent to be added to the reservoir, and provides greater accuracy in maintaining the actual concentration level of the detergent solution within the reservoir.

The supplying or replenishing of concentrated detergent solution to the wash tank reservoir may be performed on a "demand" basis, whereby the detergent concentration level within the wash tank reservoir is monitored by a conductivity cell which typically forms part of an electrical bridge or sensor circuit connected to control emissions of concentrated detergent solution from the detergent dispenser. Alternatively, the dispenser may be hydraulically linked to the wash tank, for example, by a by-pass line from the rinse line of the washer apparatus; with such a by-pass line, each time a rinse cycle of the washing apparatus is executed, the detergent dispenser is activated, dispensing to the wash tank reservoir an amount of concentrated detergent solution in pre-determined proportion to the volume of rinse water used. Since the rinse water is generally diverted to the wash tank, the combined effects of dilution by the rinse water and enrichment by the concentrated detergent solution typically maintains the desired detergent concentration. Alternatively a by-pass from the wash pump manifold may also be connected to the dispenser, for example, when the "demand" basis is employed.

Such solid detergent dispensers of the prior art have used a number of different techniques for converting solid detergent into concentrated detergent solution. The majority of such devices have been designed to convert solid detergent from its "powdered" form. The modes of operation of such dispensers depends somewhat upon the type of washing apparatus with which such dispensers are used, and upon the volume of washing performed by the wash machine apparatus over any given period of time. For example, in large, heavy washing commercial applications, the detergent dispenser may be remotely located (usually in a different physical location) from the washing apparatus and may be configured to convey the solid detergent directly from its shipping container (see for example U.S. Pat. No. 3,595,438, issued July 27, 1971 to Daley, et al and 4,020,865, issued May 3, 1977 to Moffat et al). Dispensers of this type usually have self-contained reservoirs for maintaining a supply of concentrated detergent solution produced thereby, and a pump for transferring on demand, the concentrated detergent solution to the primary wash tank reservoir of the washing apparatus proper. For lower volume commercial washing applications, it is more advantageous to use smaller detergent dispensers configured for mounting to or directly adjacent a washing machine proper. Such dispensers hold relatively smaller amounts of detergent, but offer the flexibility of being immediately accessable for loading by an operator of the washing apparatus, and are thus generally more versatile in their application, than are the larger remotely located dispensers, (see for example, U.S. Pat. No. 4,063,663, issued Dec. 20, 1977 to Larson et al). These dispensers are generally loaded from the top, and directly supply the adjacent washing apparatus reservoir with their produced detergent solution by gravity feed, thus eliminating the need and expense for pumps, while providing an added dimension of reliability. It will be understood that the below-described prior art techniques used for converting solid detergent to concentrated liquid detergent, apply both to the large, remotely located, self-contained reservoir dispensers as well as to the smaller, wall or wash machine mounted, direct gravity feed types of dispensers.

One detergent dispenser technique for converting powdered detergent, is the so-called "water-in-reservoir" type. In the water-in-reservoir dispenser, the powdered detergent is completely submerged under an aqueous solution in a holding tank or pot of the dispenser. A stand-pipe, usually located near the center of the dispenser tank, maintains a constant water/solution level within the dispenser tank. As water is added to the dispenser tank, a concentrated, saturated detergent solution or slurry is formed by the swirling action or agitation of the powdered detergent by the injected water. The added water also causes a portion of the saturated solution in the pot to flow into the stand-pipe, which is connected to supply the wash tank reservoir of the washing apparatus. Since the powdered detergent is always saturated in the water-in-reservoir type of dispenser, the concentration level of the detergent solution produced by such a dispenser over a period of time can significantly vary as the detergent within the dispenser pot is diluted. Further, such techniques are not practical for use with powdered detergents containing active chlorine, since most of the chlorine contained in such detergents is quickly lost through decomposition once the detergent is wetted. Further, there may be safety hazards involved with use of such dispensers if the operator does not carefully follow directions when charging the dispenser. Charging or recharging of such dispensers requires an operator to pour powdered detergent directly into the standing water of the dispenser tank or pot. If highly caustic containing detergent compounds are added too rapidly or in excessive quantities to the dispenser pot, the heat of hydration may cause the solution to boil and spatter. Since the water-in-reservoir type of dispensers are typically mounted above the washing apparatus, at eye level or higher with respect to the operator, such boiling and spattering may pose a danger of caustic splash or spray to the eyes or face of the operator.

Another technique for converting powdered detergent into concentrated liquid detergent, involves the technique of placing the powdered detergent over an inverted curved (usually conically or hemispherically shaped) screen having a mesh size smaller then the powdered detergent particles supported thereby. That powdered detergent which directly overlies the support screen is dissolved as needed, by a fine mist spray from a nozzle disposed below the screen. The concentrated detergent solution formed by the spray falls by gravity into an underlying reservoir, or is directed by a conduit to the wash tank reservoir of the washing apparatus. This technique solves many of the practical and safety problems associated with the water-in-reservoir type of dispenser, since the entire charge of powdered detergent is not wetted, since the solution produced is of more uniform concentration, and since an operator loading the detergent into the dispenser is not subjected to boil-over or spattering of highly caustic detergent solution. Examples of such detergent dispensers used in high-volume applications, wherein the dispenser is generally remotely located from the washing machine apparatus, and wherein the powdered detergent is converted directly from its shipping container, can be found in U.S. Pat. Nos. 3,545,438, issued July 27, 1971 (Daley) and 4,020,865, issued May 3, 1977 Moffat et al). An example of such a detergent dispenser for smaller volume applications, wherein the dispenser is mounted to or adjacent the washing machine apparatus is found in U.S. Pat. No. 4,063,663, issued Dec. 20, 1977 (Larson et al).

While the powdered detergent dispensers such as described by the Daley, Moffat and Larson patents have represented significant contributions to the art of detergent dispensing, the use of solid detergent in powdered form has a number of drawbacks in commercial applications. Due to increased sanitary standards and demands for shorter wash times, recently developed powdered detergents have relatively more complex detergent compositions that are more hazardous to the user, less stable and more difficult to dissolve in a satisfactorily uniform manner. For a detailed discussion of such problems, see the related U.S. patent application Ser. No. 875,784, filed Feb. 7, 1978 (Fernholz et al). Powdered detergents dissolve generally readily because of their high specific surface areas. However, when such powdered detergents include a mixture of a number of components having relatively different dissolving times, such detergents are susceptible to differential solubility problems in automatic detergent dispensers, depending upon the rate of dispensing or the residence (dwell) time of contact between the detergent powder and the dissolving liquid. Those particles having the greatest rate of solubility as well as the greatest specific surface tend to dissolve first, whereas those having the least specific surface and/or the lowest solubility rate tend to dissolve relatively slower. Another problem with powdered detergents relates to possible incompatibility of those constituent components or particles required in the make-up of the detergent so as to perform the required washing function. This problem is particularly acute with those detergents required to contain an active chlorine source and an organic defoamer. The problem associated with such detergents is that there is a substantial loss of available chlorine from such detergents in a relatively short period of time, due to the instability of the chlorine component. The chlorine instability problem is even more acute with high alkalinity powdered detergents because many defoamers and chlorine-containing components are not stable in the presence of highly alkyline chemicals such as sodium hydroxide.

Another problem inherent with powdered detergent, if its components are of different particle sizes and densities, is segregation of those constituent particles during manufacturing, shipping and handling. Even when uniform distribution can be achieved during manufacture, subsequent shipping and handling may cause segregation, leading to non-uniformity in the composition of the detergent when it is withdrawn from the container. Besides the inherent "physical" problems associated with powdered detergents, they are also subject to user misuse and possible abuse, due to user inefficiency, carelessness, or negligence. For example, due to their powdered form, such detergents are often misused for purposes for which they were not designed, and in applications wherein they may present safety problems to the user. Another disadvantage of powdered detergents when handled in bulk form is that they are quite susceptible to spillage onto the floor, on the washing machine, etc. by the user. Also, as previously mentioned with respect to the water-in-reservoir type of dispenser, if such powdered detergents are added too quickly or in excessive quantities to the reservoir tank of such dispensers, they may present safety hazards to the user due to boil-over and spattering.

Another form of solid detergent is the "briquette" form, comprising pre-shaped briquettes of solid detergent. Dispensing systems for dissolving detergent briquettes are known in the art. See, for example, U.S. Pat. Nos. 2,382,163, 2,382,164 and 2,382,165 all issued Aug. 14, 1945 to MacMahon, and U.S. Pat. No. 2,412,819, issued Dec. 17, 1946 to MacMahon. In those prior art systems, the detergent briquettes are dispensed from a modified water-in-reservoir pot-shaped dispenser wherein a number of the briquettes are held in a mesh basket forming a slot across the diameter of the pot. A stream of water directed against the lowermost briquette, in combination with the swirling action of water engaging the submerged portion of the lower-most briquettes provides the dissolving action. The primary advantage of using detergent briquettes in such dispensers is that the user can visually determine when the detergent dispenser reservoir needs a replenishing charge of detergent. As with the water-in-reservoir type of dispenser, however, water is left standing in the reservoir, and a portion of the briquettes are submerged within that water. Accordingly, where there are incompatible components within the detergent briquettes, there can be undesirable interaction therebetween. Further, if the detergent contains a defoamer, that defoamer tends to float to the top of the reservoir during periods of inactivity, forming a slag at the water surface. For these and other reasons, the briquette detergent approach has not attained that degree of commercial success in the conventional institutional and industrial washing machine art, as has the powdered detergent dispensing approach.

The present invention overcomes many of the abovementioned shortcomings of prior art liquid, powdered and briquette type detergent dispensers. The dispenser apparatus of the present invention provides a concentrated detergent solution for use by washing machines (either of the type remotely located or the type located on or immediately adjacent the dispenser) by proportionately dissolving as needed, solid block-type detergent compositions such as solid-cast detergents, detergent cakes and other solid detergents having significant geometric volume. The dispenser apparatus of the present invention provides a simple, efficient, non-hazardous and reliable technique for producing highly concentrated detergent solution either on a demand basis or by the hydraulically linked by-pass method. The concentrated detergent solution produced by the dispenser of this invention is substantially uniform throughout the conversion of the entire block of solid detergent, and the detergent charge can be rapidly and safely replaced by the user.

SUMMARY OF THE INVENTION

The present invention comprises detergent dispenser apparatus for producing concentrated detergent solution from a solid detergent composition in the blocktype form. The dispenser includes a housing member suitable for fixed mounting to a solid surface, such that the housing member maintains a pre-determined position with respect to the mounting surface. One embodiment of the invention is configured for mounting to a vertical wall; however, the housing could equally well be configured for mounting to fixed surfaces of other shapes and angular attitudes. The detergent dispenser of this invention could be mounted directly to a washing apparatus to which the concentrated detergent solution is to be supplied, adjacent to such washing apparatus, or at a position remote from such washing apparatus.

The dispenser housing defines an inner cavity and access and discharge ports opening into the inner cavity. The access port is of suitable configuration for accepting a charge of solid block detergent into the inner cavity, in a manner such that at least one surface of the block detergent is exposed and substantially enclosed within the cavity. The discharge port may be of any size and configuration suitable for providing a passageway through which the concentrated detergent solution produced by the dispenser can leave the inner cavity, for subsequent use by a washing machine. Such discharge port may open directly into an underlying collector of reservoir of the dispenser, into a wash tank reservoir of a washing machine, into a fluid-flow conduit, or into other appropriate means, for transportably carrying the concentrated detergent solution produced by the dispenser apparatus.

Nozzle means are mounted to extend into the housing cavity for directing a pressurised spray of predetermined pattern and direction into the cavity, for dissolving the solid block detergent in the cavity by hydraulic and errosive action of the spray pattern upon the exposed surface of the block detergent.

Retaining means in the dispenser housing are disposed to receive the charge of solid block detergent introduced into the cavity through its access port. Retaining means position and retainably hold the received block detergent in fixed position within the cavity, to position the exposed surface of the block detergent in cooperative pre-determined alignment with the nozzle means, such that the spray pattern from the nozzle means impringes generally uniformly upon substantially the entire exposed surface of the held block detergent. One embodiment of the invention includes safety switch means for blocking fluid flow to the nozzle means whenever the solid block detergent charge is not properly disposed in its pre-determined fixed position within the housing cavity.

In one embodiment of the invention, the solid block detergent charge is retainably held by cartridge means, which holds a geometrically shaped volume of the solid block detergent so as to expose at least one surface thereof. In this embodiment of the invention, the cartridge means is configured for insertion into the access port of the housing. The retaining means is disposed to accept the cartridge means and to releasably maintain the cartridge means in fixed position relative thereto such that the exposed surface of the held block detergent lies substantially enclosed within the cavity and in fixed pre-determined position with respect to the nozzle means. In a preferred embodiment of the invention, substantially the entire detergent holding portion of the cartridge means is configured for insertion within the inner cavity of the housing; however, other cartridge means could be configured according to the principles of this invention, wherein a portion of the cartridge means lies outside of the housing, for example, in a manner such that the cartridge means itself forms a part of the housing which defines the inner cavity.

The cartridge means may include a disposable receptacle member for retainably holding the solid block detergent. The disposable cartridge member is particularly useful when the dispenser apparatus is used with solid detergent compositions of the cast type, wherein the disposable cartridge receptacle may comprise the actual mold in which the cast detergent is manufactured.

Alternatively, where insertable detergent cartridge members are used, that cartridge member may be reusable. In such instances, the detergent cartridge member would be configured to retainably accept and hold at least one charge of solid block detergent, and such that a spent or depleted detergent charge could be readily replaced by a fresh charge when desired or required.

The invention applies both to dispenser configurations wherein the nozzle spray is directed toward the exposed detergent surface from a position below the exposed surface as well as to configurations wherein the spray is directed from a position above the exposed detergent surface. In a preferred embodiment of the invention, the nozzle means is generally disposed above the exposed detergent surface and such that the longitudinal spray axis of the nozzle means is generally at a right angle to the general plane of the exposed detergent surface. In the preferred embodiment of the invention, the exposed detergent surface is maintained at a predetermined fixed angle within the cavity, between 10 degrees and 90 degrees with the horizontal, such that the spray from the nozzle means dissolves the solid detergent both by hydraulic action through direct impingement upon the surface and by errosive action of the converted spray liquid which cascades by gravity down the exposed detergent surface.

It will be understood that many configurations of the retaining means for the solid block detergent can be designed within the scope of this invention. In a dispenser wherein the nozzle means is disposed below the exposed detergent surface, the retaining means preferably would include a screen mesh member mounted below the solid detergent block either for supportably holding the block detergent, or for preventing particles thereof from falling into the underlying collection reservoir for the concentrated detergent solution.

One embodiment of a receptacle, cartridge type of retaining means includes a mesh member overlying the exposed surface of the detergent block, to prevent solid particles of the retainably held detergent block from passing directly to the discharge port of the cavity. A preferred configuration of such an insertable cartridge-type of retaining means comprises a plurality of receptacles for retainably holding a plurality of different blocks of solid detergent compositions. Such plurality of receptacles may be configured and sized to hold incompatible detergent compositions, whereby the pressurized spray of the nozzle means simultaneously dissolves the solid detergent compositions from each of the plurality of receptacles in desired proportions, depending upon the relative sizes of the receptacles and the particular compositions of the solid detergents held respectively thereby.

While the present invention will be described in combination with a particular configuration of the dispenser housing and the retaining means for the solid detergent, it will be understood that other configurations could be designed within the spirit and intent of this invention. Further, while the preferred embodiment of the invention will be described with respect to apparatus which exposes only one surface per retainably held piece of solid block detergent, the principles of this invention can be extended to dispenser configurations wherein multiple surfaces of retainably held solid detergent blocks are simultaneously exposed to spray patterns from appropriate nozzle means. Further, while the present invention will be described with reference to a preferred embodiment thereof, wherein a particular orientation of the exposed surface of the retainably held block detergent is illustrated, the principles of this invention extend beyond such illustrations of the preferred embodiment, and are limited only by the claims annexed hereto. Similarly, while specific safety feature circuits and techniques will be described with respect to the preferred embodiments of this invention, other safety control means and techniques could equally well be devised within the scope of this invention, which would render the dispensing apparatus non-hazardous to an operator or user of the device.

Various advantages and features of novelty which characterize the invention are pointed out with particularity in the claims, annexed hereto and forming a part hereof. However, for a better understanding of the invention and its advantages obtained by its use, reference should be had to the Drawing which forms a further part hereof. However, for a better understanding of the invention and its advantages obtained by its use, reference should be had to the Drawing which forms a further part hereof and to the accompanying descriptive matter in which there are illustrated and described several embodiments of the invention.

BRIEF DESCRIPTION OF THE DRAWING

Referring to the Drawing, where like numerals represent like parts throughout the several views.

DETAILED DESCRIPTION OF THE INVENTION

Referring to the Figures, there is generally disclosed at 20 a detergent dispenser for solid detergent compositions of the block-type, generally constructed according to the principles of this invention. That embodiment of the dispenser 20 illustrated in the Figures is one of the type suitable for servicing relatively smaller wash applications, wherein the detergent dispenser is generally mounted directly to the washing machine or immediately adjacent thereto, such that the concentrated detergent solution formed by the dispenser apparatus will flow by gravity into the wash tank of the washing machine proper (not illustrated). It will be understood that the particular embodiment described in the Figures, represents only one of many possible embodiments and applications for the invention, and that the invention is not limited to those embodiments herein disclosed.

Figure 7:
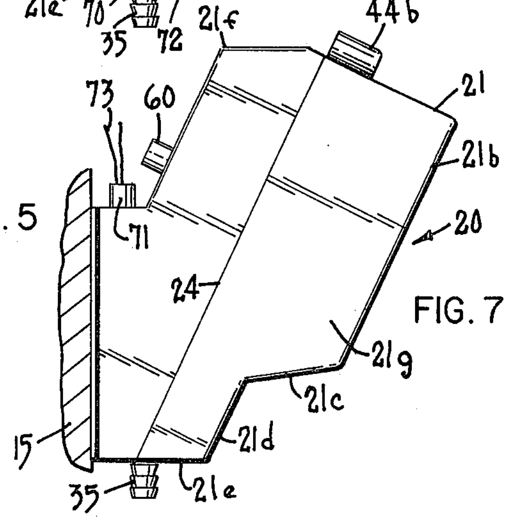
FIG. 7 is a view in side elevation of the solid detergent dispenser disclosed in FIG. 1.

The dispenser 20 has a housing portion 21, constructed of any suitable material capable of withstanding exposure to highly caustic detergent solutions, and is preferably configured of stainless steel or molded plastic material. The housing 21 has a generally planar back wall 21*a* suitable for direct engagement with and mounting to a vertical mounting surface or wall 15 (FIG. 7). The back wall 21*a* includes a plurality of mounting slots 22 formed therethrough, to enable fixed mounting of the housing 21 to a solid vertical surface such as a vertical wall of a washing machine or a vertical wall disposed adjacent a washing machine. It will be understood that the housing 21 could be configured for mounting to any solid surface, and is not limited to mounting to a vertical, or even to a planar surface.

The housing 21 defines a substantially enclosed inner cavity 30. For ease of reference and distinguishing the various portions of the inner housing cavity 30, referring to FIG. 8, the upper portion of the inner cavity will be referred to as the spray region 30*a* of the cavity, and the lower portion of the inner cavity 30 will be referred to as the collector region 30*b* thereof.

Figure 5:
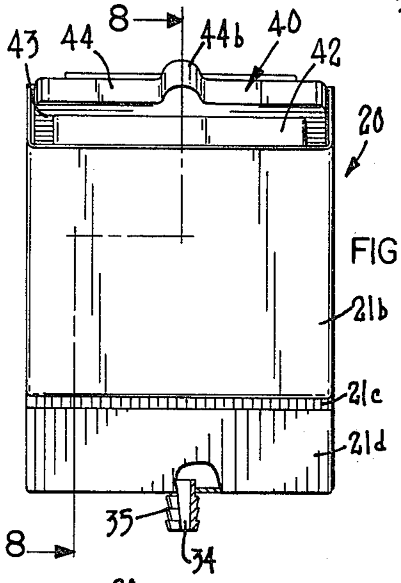
FIG. 5 is a view in front elevation with portions thereof broken away, of the solid detergent dispenser disclosed in FIG. 1.
Figure 6:
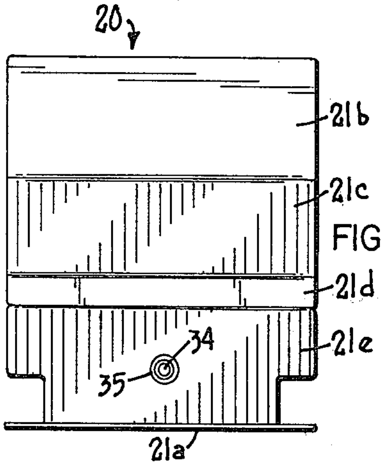
FIG. 6 is a view in bottom plan of the solid detergent dispenser disclosed in FIG. 1.

The upper portion of the housing 21 defines a mouth or access port 32 opening into the inner cavity 30, and a discharge port 34 (FIGS. 5 and 6) opening into the inner cavity 30 and forming a passageway through the housing 21 for concentrated detergent solution collected or accumulated within the lower portion of the inner cavity 30 of the housing 21. The housing 21 has a hose clamp extension 35 configured around the discharge port 34, having a plurality of annular ribs configured for engaging the inner walls of a connecting conduit or hose (not illustrated), for directing fluid flow from the discharge port 34. While a specific configuration of the discharge port 34 is illustrated in the embodiment of the invention disclosed in the Figures, it will be understood that other configurations of the discharge port are possible depending upon the overall configuration of the dispenser 20. For example, in a dispenser configuration wherein the dispenser proper includes an underlying reservoir for collecting the concentrated detergent solution formed by the dispenser, the entire bottom portion of the inner cavity 30 may comprise the discharge port 34, which would directly open into the underlying reservoir of such a dispenser apparatus, (see for example such an outlet port configuration as illustrated in U.S. Pat. No. 4,020,865, issued May 3, 1977 to Moffat et al). Similarly, as hereinafter described in more detail, the access port 32 can assume many varied configurations, and need not necessarily be disposed so as to open into the upper portion of the inner cavity 30. For example, in a bottom loading dispenser, the access port may be located at the bottom of the dispenser housing, and may also comprise the outlet port of such a dispenser.

An upper front wall 21*b* of the housing 21 projects downwardly from the access port 32 at an inclined angle to the horizontal. In the embodiment of the invention illustrated in the Figures, the upper front wall 21*b* forms an angle of approximately 60 degrees with the horizontal. The upper front wall 21*b* terminates at and is continuous with a first lower wall 21*c* of the housing 21, which is also slightly inclined with respect to the horizontal and lies in a plane generally parallel to that of the upper front wall 21*b*. The lower front wall 21*d* terminates at and is continuous with a bottom wall 21*e* of the housing, through which the discharge port 34 is formed. In the Figures, the bottom wall 21*e* is generally planar, however the bottom wall 21*e* could assume many different configurations (such as ramp-shaped or funnel-shaped), and is generally configured so as to direct liquids accumulated within the lower collector region 30*c* of the housing to the discharge port 34.

The back wall 21*a* extends between the bottom wall 21*e* and an upper wall, generally designated at 21*f*, which extends to and defines one edge of the access port 32. When viewed in cross-section as in FIG. 8, that region of the inner cavity 30 generally located between the upper front wall 21*b*, the first lower wall 21*c* and the back wall 21*a* and the upper wall 21*f* comprises the upper spray region 30*a*; whereas that region of the inner cavity 30 generally located between the lower front wall 21*d* and the back wall 21*a*, and extending down to the bottom wall 21*e* generally comprises the collector region 30*b*.

The housing 21 further has a pair of oppositely disposed side walls 21*g* generally vertically extending between the bottom upper wall 21*e* and the upper wall 21*f*, and laterally extending between the back wall 21*a* and the front wall 21*b*, the first lower wall 21*c* and the lower front wall 21*d*. The side walls 21*g* are each configured to define a flange or land region 24 extending into the inner cavity 30 in generally parallel spaced relationship to one another and being generally co-planar with one another so as to lie in a plane generally parallel to that of the upper front wall 21*b*. The land regions 24 are disposed to extend from the access port 32 downwardly to the bottom wall 21*e*, and cooperatively form with the front wall 21*b* oppositely disposed channels or races within the inner cavity 30 for slidably retainably engaging a cartridge member 40.

Figure 2:
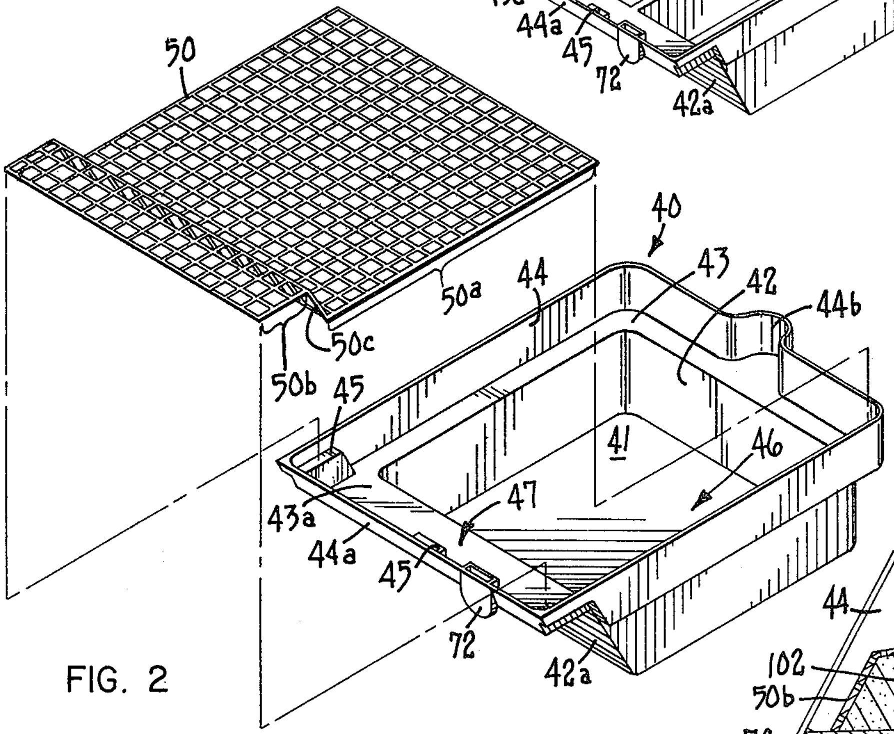
FIG. 2 is an exploded view in perspective of one embodiment of the cartridge-type receptacle member for holding a charge of solid block detergent, and disclosed in FIG. 1.

One embodiment of a cartridge member 40 suitable for removable insertion within the access port 32 of the dispenser 21 is illustrated in more detail in FIG. 2. Referring to FIG. 2, the cartridge 40 is basically a receptacle or container-shaped member suitable for retainably holding in fixed position relative thereto a block of solid detergent composition. As referred to herein, the term "solid block" detergent composition refers to any geometric volume or mass of solid detergent regardless of the method in which such detergent is manufactured, such as a cast detergent, a cake detergent, and agglomerate-type detergent, or other types of solid detergents having substantial volume or mass (as distinguished from solid "powdered" or "liquid" detergents). The cartridge member 40 generally comprises a bottom surface 41, a lower peripheral side wall portion 42, an intermediate ledge region 43 and an upper peripheral side wall portion 44. While the cartridge member 40 may assume any geometric configuration suitable for exposing at least one broad surface of a solid block detergent composition retainably held thereby, the particular configuration of the cartridge member illustrated in FIG. 40 is of a generally rectangular shape. The lower peripheral side wall portions 42 extend between the bottom surface 41 and the intermediate ledge region 43, with all except one surface of the lower peripheral side walls (that surface designated as 42*a*) being disposed generally perpendicular to the bottom surface 41. The non-perpendicular lower peripheral side wall portion 42*a* is configured to define an angle with the bottom surface 41 corresponding to the included angle defined between the upper front wall 21*b* and the first lower wall 21*c* of the dispenser housing 21 (see FIG. 8). The intermediate ledge region 43 of the cartridge member 40 lies in a plane generally parallel to the bottom surface 41. The upper peripheral side wall portion 44 projects upwardly from the intermediate ledge region 43, with the walls on three sides thereof lying generally perpendicular thereto. The fourth side of the upper peripheral side wall 44*a* forms an included angle with the general plane of the intermediate ledge region 43 substantially equal to that of the included angle formed between the lower front wall 21*d* and the bottom wall 21*e* of the dispenser housing 21 (see FIG. 8).

The 43*a* portion of the intermediate ledge region is disposed between the lower and upper peripheral side wall portions 42*a* and 44*a* respectively, and is somewhat wider (as measured between corresponding upper and lower peripheral side wall portions) than the width of the intermediate ledge region 43 of the other portions of the cartridge member 40. A plurality of raised land areas or mounting surfaces 45 project upwardly from the intermediate ledge region 43*a*, the upper surfaces respectively thereof lying generally in a common plane.

Figure 8:
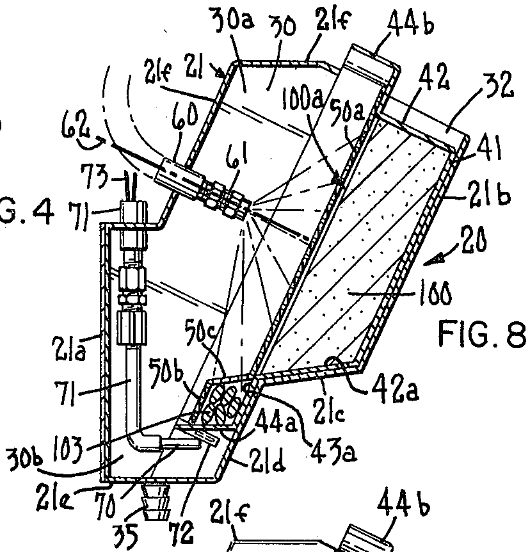
FIG. 8 is a sectional view of the solid detergent dispenser disclosed in FIG. 5, taken generally along the Line 8—8 thereof.

The lower peripheral side walls 42 and 42*a* cooperatively define with the bottom surface 41 a first receptacle-shaped container 46 for retainably holding a geometrically shaped volume or mass of solid block detergent composition 100 (see FIG. 8). In the preferred embodiment of the invention, the first receptacle-shaped container 46 retainably holds a solid "cast" detergent composition which is poured directly into the receptacle-shaped container portion 46 of the cartridge member 40, the container portion 46 physically forms the mold in which the solid cast detergent 100 is manufactured. The retainably held charge of solid detergent 100 within the container portion 46 of the cartridge member 40 defines a broad, generally planar upper surface 100*a* lying generally in the same plane as the intermediate ledge region 43, or slightly there-below. The upper detergent surface 100*a* is disposed for exposure to spray from a nozzle means, hereinafter described in more detail.

The elongated intermediate ledge region 43*a* defines the bottom surface of a second receptacle-shaped container, generally designed at 47 (see FIGS. 2 and 8). A screen or mesh member 50 is configured for mounting to the intermediate ledge region 43 (other than at the extended intermediate ledge region portion 43*a*) and to the raised mounting surfaces 45, in spaced relationship to the underlying extended intermediate ledge region 43*a*, so as to overlie respectively the first and second receptacle-shaped container regions 46 and 47. The screen member 50 has a first generally planar portion 50*a*, (FIG. 2) a second generally planar portion 50*b* and an interconnecting wall portion 50*c*. The first screen portion 50*a* is sized to fit between the opposing upper peripheral side walls 44 and is configured for mounting to the three contiguous portions of the intermediate ledge regions 43, exclusive of ledge region 43*a*, for substantially overlying the first receptacle-shaped container portion 46 of the cartridge member 40. The second portion 50*b* of the screen member 50 lies in a plane generally parallel to and spaced above that of the first screen portion 50*a*, and is configured for mounting to the plurality of raised mounting surfaces 45 so as to substantially overlie the extended intermediate ledge region 43*a* and the second receptacle-shaped container region 47 of the cartridge member 40. The interconnecting wall portion 50*c* of the screen member 50 forms included angles with the first and second 50*a* and 50*b* portions of the screen member 50, substantially the same as those included angles which the lower peripheral side wall portion 42*a* forms with the bottom surface 41 and with the intermediate ledge region 43*a* of the cartridge member 40. When mounted to the cartridge member 40, the interconnecting wall portion 50*c* of the screen member 50 forms included angles with the first and second 50*a* and 50*b* portions of the screen member 50, substantially the same as those included angles which the lower peripheral side wall portion 42*a* forms with the bottom surface 41 and with the intermediate ledge region 43*a* of the cartridge member 40. When mounted to the cartridge member 40, the interconnecting wall portion 50*c* of the screen member 50 lies generally co-planar with the lower peripheral side wall portion 42*a*, and operatively forms an extension thereof, to define with the extended intermediate ledge region 43*a* and the upper peripheral side wall portion 44*a* and those oppositely disposed portions of the upper peripheral side wall 44 lying contiguous with the extended intermediate ledge region 43*a*, the second receptacle-shaped container 47.

The cartridge member 40 may be constructed of any suitable material that is capable of withstanding exposure to highly caustic detergent solutions, and is preferably configured of molded plastic material such as polyethylene or polypropylene. The cartridge member can be supplied with solid block detergent and sold as an article of commerce, wherein the entire cartridge member 40 or portions thereof can be discarded after the detergent charge retainably held thereby has been exhausted. When the cartridge member is a disposable item, the screem member 50 would be permanently welded or bonded to the intermediate ledge region 43 and the plurality of raised land areas 45.

Alternatively, the cartridge member 40 could be a re-usable item, possibly constructed of stainless steel, wherein the screen member 50 could be detachably secured to the underlying cartridge member 40 so as to enable re-charging of the solid block detergent retainably held by the various receptacles of the cartridge member. The screen member 50 may be of any suitable material capable of withstanding exposure to highly caustic detergent solutions, and is in the preferred embodiment, preferably constructed of a plastic material. The mesh size of the screen member 50 is configured so as to be small enough to prevent solid particles of the solid block detergent held by the receptacle-shaped containers of the cartridge member 40 from passing therethrough, yet must be large enough so as to permit relatively unobstructed passage therethrough of a pressurized spray pattern directed at the underlying exposed surfaces of the solid block detergent. In general, the mesh size of the screen member 50 should be no larger than the largest dimension of the discharge port 34, so as to prevent any solid chunks or pieces of the solid block detergent which would pass therethrough, from clogging the free flow of concentrated detergent solution through the discharge port 34.

Figure 10:
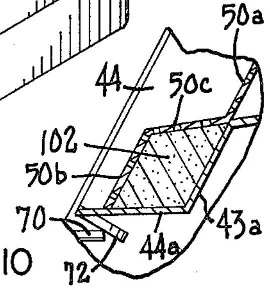
FIG. 10 is a fragmentary view of a portion of the solid detergent dispenser disclosed in FIG. 8, illustrating an alternate embodiment of the nature of the solid-detergent charge held by the cartridge means.
Figure 4:
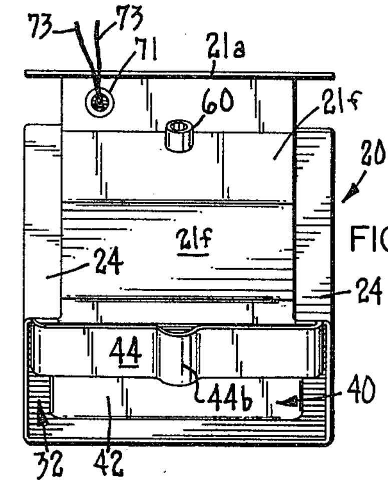
FIG. 4 is a view in top plan of the solid detergent dispenser disclosed in FIG. 1.

The first receptacle-shaped container 46 of the cartridge member 40 is configured to hold the primary solid detergent composition used in the cleaning operation. The preferred usage of the first receptacle-shaped container 46 would be for retainably holding a solid "cast" block detergent similar to that described within co-pending patent application Ser. No. 875,784, filed Feb. 7, 1978 (Fernholz et al); however, other forms of solid block-type detergent could be retainably held by the first receptacle-shaped container 46. The second receptacle-shaped container 47 is configured for retainably holding a long narrow block of a second solid block detergent composition 102 (see FIG. 10) or a plurality of pillow-shaped pieces, briquettes, tablets or pellets of a second solid detergent composition, such as a chlorine source (e.g. calcium hypochlorite) or a defoamer detergent composition (see co-pending patent application Ser. No. 875,784). The briquette or tablet form of the second detergent composition retainably held by the second receptacle-shaped container 47, is illustrated at 103 in FIG. 8.

Figure 3:
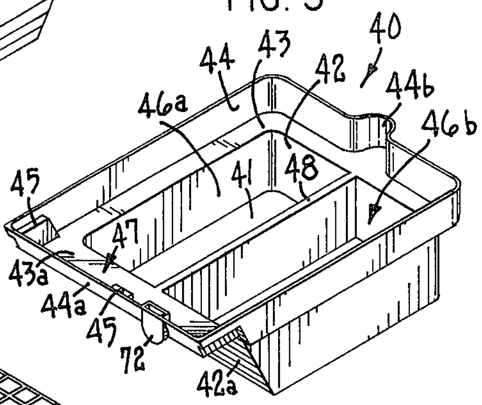
FIG. 3 is a view in perspective of a second embodiment of the cartridge-type receptacle member for holding a charge of solid block detergent, and disclosed in FIG. 1.

While the cartridge member 40 illustrated in FIGS. 2 and 8 includes two receptacle-shaped containers for separately holding two different solid block-type detergent compositions, the cartridge member 40 need not necessarily contain a plurality of separably distinct receptacles. For example, the cartridge member could comprise a single receptacle-shaped container for retainably holding a single mass or block of solid detergent composition which detergent composition could be uniform, or could contain "cores" or "pockets" or entire sections of different detergent compositions such as chlorine sources, defoamers, etc., as described in co-pending patent application Ser. No. 875,781. Alternatively, the receptacle member 40 could be modified to include more than two receptacle-shaped containers, as indicated in FIG. 3, wherein the first receptacle-shaped container 46 is partitioned by means of a dividing wall 48, to define a pair of receptacle-shaped containers 46*a* and 46*b* for retainably holding two distinct masses or geometrically shaped volumes of solid block detergent compositions.

It will be understood that many configurations of a solid block detergent composition retaining means can be configured within the spirit and intent of this invention, the receptacle member 40 being only one possible configuration for such a retaining moans. Even within the concept of using a cartridge member 40, many such shapes and configurations of such a cartridge retaining members are possible. While in the preferred embodiment, a generally rectangular shape of the receptacle-shaped containers of the cartridge member 40 have been disclosed, other geometric configurations and shapes such as cylindrical, triangular, various polygon-shapes and numerous other regular or irregular shapes could be employed. Further, while the broad exposed surface 100*a* of the retainably held solid block detergent mass 100 is disclosed as a generally planar surface, other configurations and shapes of such surface are possible, for example, but not limited to concave, convex, spherical, pyramidical, conical, etc. shapes. Further, while the exposed detergent surface 100*a* is generally illustrated as lying co-extensive with the outer peripheral boundaries of the cartridge member 40 (e.g. generally co-planar with the intermediate ledge region 43 thereof), the retaining means for the solid block detergent need not necessarily engage the solid block detergent on all but one side thereof. The primary consideration is that the retaining means actually retainably hold and maintain the position of the solid block detergent relative thereto, such that the exposed surface or surfaces thereof, wherever they may be, are maintained in predetermined fixed positions relative to the projected spray pattern or patterns from a nozzle means, hereinafter described in more detail.

Figure 1:
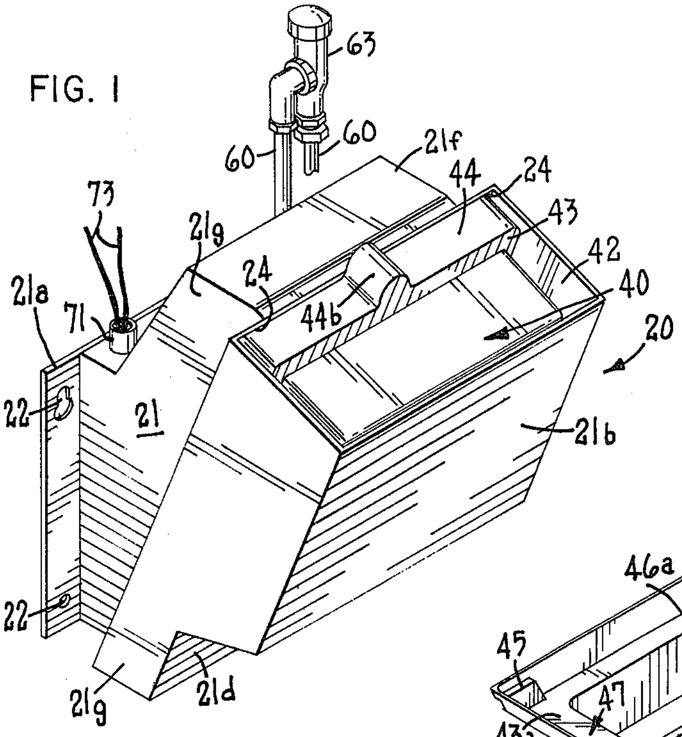
FIG. 1 is a view in perspective of a solid detergent dispenser constructed according to the principles of this invention.

In the preferred embodiment of the detergent dispenser disclosed in the Figures, the height and width of the cartridge member 40 are sized for cooperative insertion within the access port 32 of the housing 21, as illustrated in FIG. 1. The lower portions of the intermediate ledge regions 43, which lie on oppositely disposed sides of the cartridge 40 are configured to slidably engage and be directed by the land or flange portions 24 of the sidewalls 21*g* of the housing 21, such that the flange portions 24 of the side walls 21*g* cooperatively guide the cartridge 40 from its receipt through the access port 34 into a fixed pre-determined position with respect to the housing, (as indicated in FIG. 8). When inserted into the access port of the dispenser (see FIGS. 1 and 8), the cartridge member 40 lowers under the force of gravity and is directed by the guiding flanges 24 into the inner cavity 30, until the lower peripheral side wall portion 42*a* comes into resting engagement with the first lower wall 21*c* of the housing 21. When disposed in such fixed, pre-determined resting position, the upper peripheral side wall portion 44*a* located at the "top" portion of the positioned cartridge 40 cooperatively engages the side wall flanges 24 and the upper wall 21*f* of the housing 21 for preventing liquid spray out from the upper spray region 30*a* of the inner cavity 30 through the access port 32. While the embodiment disclosed in the Figures uses the cartridge itself in cooperation with a safety switching means (hereinafter described) to contain the nozzle spray within the inner cavity, other closure means, for example an elastomer seal, a shield, a deflector, a sliding closure means or a hinged door or lid (none illustrated), could be used to contain the nozzle spray within the inner cavity 30 of the housing 21.

That portion of the upper peripheral side wall 44 oppositely disposed from the side wall portion 44*a* defines a semi-circular projection 44*b* comprising a "handle", allowing an index or middle finger to be inserted in the hollow of such handle to permit ease of holding and removal of the cartridge 40 from the dispenser housing 21.

Referring to FIGS. 8 and 1, a conduit member 60 is secured to the upper wall 21*f* of the housing 21 and projects therethrough into the upper spray region 30*a* of the inner cavity 30. A spray-forming nozzle 61 is threaded or otherwise properly secured to that end of the conduit 60 extending into the inner cavity 30 and is disposed therein, so as to project a spray pattern of pre-determined shape at substantially the entire respective exposed solid detergent block surfaces of the detergent within the various receptacle chambers of the cartridge member 40. The nozzle 61 is oriented, relative to the "fixed" position of the cartridge member 40 within the inner cavity 30, such that the longitudinal spray axis 62 from the nozzle is disposed generally perpendicular to the broad exposed upper surface 100*a* of the solid block detergent volume 100. The spray nozzle may be of any suitable configuration and construction for projecting a pressurized spray of aqueous liquid (preferably water) received through the conduit 60, in a pre-determined pattern, configured to directly impinge upon substantially the entire exposed surfaces of the solid block detergent retainably held by the cartridge member 40. In that embodiment of the invention disclosed in the Figures, the particular spray nozzle produces a "square" spray pattern (as viewed in a plane generally prependicular to the longitudinal spray axis 62) for directing the spray pattern ejected therefrom at substantially the entire exposed surface 100*a* as well as at the exposed surface or surfaces of the solid block detergent retainably held by the second receptacle-shaped container 47. The water supply conduit 60 passes through a siphon breaker 63 and is connected, in operation, to a suitable pressurized source of water, generally ranging between 5 and 70 psi. A safety valve 64 preferably as a solenoid valve, may also be inserted between the nozzle 61 and the pressurized water source for selectively blocking the flow of water through the conduit 60 to the nozzle 61 (see FIG. 9).

Figure 9:
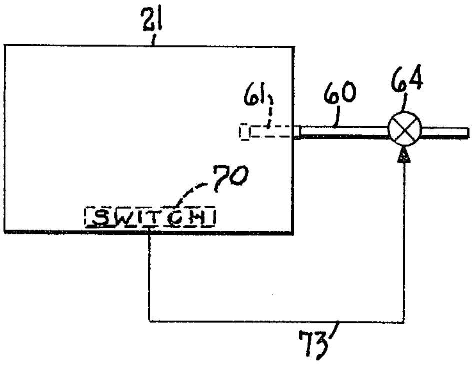
FIG. 9 is a diagrammetic view illustrating one embodiment of a safety control mechanism for controlling the nozzle spray of the solid detergent dispenser apparatus of this invention.

A safety switch configuration is mounted within the housing 21 for sensing the operative position of the cartridge member 40 within the inner cavity 30. In the embodiment of the invention illustrated in the Figures, the safety mechanism comprises a reed switch member, generally illustrated at 70, mounted in a fixed position within the collector region 30*b* of the inner cavity 30 by means of a mounting bracket 71 (see FIG. 8). The upper peripheral side wall portion 44*a* of the cartridge 40 contains an encapsulated magnet 72. The position of the magnet and the reed switch 70 are relatively disposed with respect to one another, such that the reed switch 70 is activated by the magnetic flux of the magnet 72 only when the cartridge member 40 has been fully accepted into the inner cavity 30 of the dispenser 21 in its pre-determined fixed position (as illustrated in FIG. 8), whereby the access port 32 of the housing 21 is substantially closed by the positioned cartridge member 40. Referring to FIG. 9, the reed switch 70 is activated by the magnet 72, so as to energize the solenoid valve 64 by means of the signal flow path 73 (and by any appropriate circuit means, not illustrated in the Figures) to "open" the valve 64, thus permitting pressurized fluid flow to the nozzle 61 only when the cartridge member 40 is positioned in its pre-determined fixed position within the inner cavity 30 of the housing 21. As the magnet 72 is withdrawn out of activating proximity with the reed switch 70, the reed switch changes its energization state, providing an appropriate energizing (or de-energizing) signal to the valve 64, to block pressurized fluid flow through the conduit 60 to the nozzle 61.

While a specific safety control switching arrangement has been illustrated for selectively blocking the pressurized fluid flow to the nozzle 61, it will be understood that many possible configurations of such a safety switching mechanism can be devised, which fall within the scope of this invention. For example, mechanical switching configurations such as micro-switches could be employed, as well as optical sensors, mercury switching sensors, or purely mechanical linkage detection and valve activating means. Further, since the primary object of such safety control means is to prevent accidental spray discharge from the nozzle 61 out of the access port 32, the relative positioning of such switch detection means can readily be varied by those skilled in the art to achieve the intended purpose therefor.

OPERATION OF THE PREFERRED EMBODIMENT

Operation of the solid detergent dispensing apparatus of this invention is relatively simple and is briefly described below. In the preferred embodiment of the invention, illustrated in FIGS. 4 through 9, the cartridge member 40 retainably holds the charge of solid block detergent, and is configured as a disposable item such that once the charge of solid detergent contained thereby is depleted by the spray action within the dispenser, the cartridge member itself is rapidly removed from the housing and discarded. In the preferred embodiment, the volume of solid block detergent 100 retainably held by the first receptacle-shaped container 46 comprises a volume of solid cast block detergent which has been formed during manufacture thereof directly into the first receptacle-shaped container 46, or can be cut from a larger block of such solid detergent to fit the retaining shape of the first receptacle-shaped container 46. The volume of solid block detergent 100 comprises the primary detergent composition (generally highly alkaline) required for cleaning operations within the washing machine which the detergent dispenser 20 is servicing.

The second receptacle-shaped container 47 contains a relatively smaller charge of solid block detergent composition formed into tablets or pellets. In a preferred warewashing application for the detergent dispenser 20 (i.e. dishwashing usage), the solid block detergent tablets 103 are comprised of calcium hypochlorite, or other active chlorine sources, and provide a source of chlorine when subjected to contact with an aqueous solution. The pellets or tablets 103 could also contain or be replaced by a defoamer detergent composition. Alternatively, both the chlorine and/or the defoamer compositions, if desired: could be included within the larger solid detergent block 100; could be mixed with one another in tablet form in the second receptacle-shaped container 47; could be formed as isolated inserts or cores within the larger solid detergent block 100; or could be formed as separate solid blocks either within the first or the second receptacle-shaped containers 46 and 47 respectively. In general, the density and composition of the solid detergent compositions contained within a single cartridge member 40 are selected, and the relative solid detergent blocks are sized with respect to one another such that the proper desired mixture results therefrom when the nozzle spray is directed upon the exposed surfaces thereof. The physical makeup of the respective solid detergent blocks is also designed such that the dissolution rates thereof are somewhat uniform with respect to their respective volumes, such that all receptacles of the cartridge member 40 are depleted generally uniformly.

Charging the dispenser 20 with a cartridge 10 is a simple and relatively fool-proof technique. An operator grasps the loaded cartridge member 40 by means of the handle 44*b* and merely aligns the forward end thereof (i.e. the 44*a*, 43*a* and 42*a* portion) with the access port 32 of the dispenser 21 and drops the cartridge member 40 into the access port 32, as indicated in the Figures. The land or flange regions 24 of fhe side walls 21*g* of the dispenser 21 automatically cooperatively engage the corresponding intermediate ledge regions 43 of the cartridge member 40, to slidably guide and position the cartridge member 40 within the inner cavity 30 of the dispenser 21, such that the broad upper surface 100*a* of the solid detergent block 100 comes to rest when the cartridge 40 is fully inserted within the housing 21, at a predetermined fixed position relative to the overlying nozzle 61.

If an operator should inadvertently place the cartridge member 40 into the access port 32 either in upside down or backwards manner, the unique configuration of the cartridge member 40 will not cooperatively engage the guiding flange portions 24 of the side walls 21*g* of the dispenser 21, thus preventing the cartridge member 40 from proceeding downwardly to its predetermined resting position within the cavity 30.

As the cartridge member 40 comes to rest in its predetermined fixed position within the inner cavity 30 of the housing 21, the magnet 72 comes into cooperative activating position with respect to the reed switch 70 enabling the solenoid valve 64 to open the fluid flow path through conduit 60 to the nozzle spray means 61. Should the cartridge member 40 be inadvertently placed upside down into the access port, or be placed backwards therein, the magnet 72 would not come into the activating or "safe" proximity range of the reed switch 70, which would cause the reed switch 70 and associated circuitry connected therewith (not illustrated), to energize the solenoid valve 64 so as to block fluid flow through conduit 60 to the nozzle means 61. Therefore, unless and until the cartridge member 40 is fully inserted, in proper direction and orientation, within the inner cavity of the housing 21, spray through the nozzle 61 will be blocked, thus preventing potentially hazardous spray out of the access port 32. It will be noted that once the cartridge member 40 is fully inserted within the housing 21 in its predetermined fixed resting position, the cartridge 40 prevents hazardous spray from the nozzle 61 out of the access port 32 by substantially closing the access port, with its upper and lower peripheral side wall portions 44 and 42 and its intermediate ledge region 43.

Once the cartridge member 40 is properly inserted at its fixed pre-determined position thin the inner cavity 30, the masses or volumes of solid detergent blocks retainably held by the various receptacles within the cartridge 40 are dissolved at a pre-determined rate, by the pressurized spray from the nozzle 61. A pressurized source of water is provided to te nozzle 61 as commanded by appropriate control means within the washing machine proper which the detergent dispenser services. For example, if a "demand" system is being used, an electronic control network such as described in U.S. Pat. No. 3,680,070 to Nystuen, owned by the common assignee of this invention, could be used to selectively provide pressurized water to the nozzle 61. Alternatively, the hydraulic by-pass method, as previously described, could be employed, as well as any other appropriate control mechanism.

Once pressurized fluid flow is applied to the nozzle 61, the nozzle generates a pressurized spray pattern of pre-determined configuration, which is uniformly directed across substantially the entire upper exposed surface 100*a* of the solid detergent block 100, as well as against the exposed surfaces of the solid detergent block materials 102 or 103 contained within the second receptacle-shaped container 47. The spray pattern passes through the mesh of the screen member 50 and impinges directly upon the exposed surfaces of the retainably held solid detergent blocks, dissolving by means of the hydraulic action of the spray itself, a portion of the solid detergent blocks, at their respective exposed surfaces. After striking the exposed surface 100*a* of the detergent block 100, the spray (now converted into a liquid), flows by gravity down the exposed surface 100*a*, dissolving by errosive action, further detergent at the exposed upper surface 100*a*. Upon reaching the interconnecting wall portion 50*c* of the screen member 50, the concentrated liquid solution cascades over and through the solid detergent chlorine-source or defoamer pellets or tablets 103 held within the second receptacle-shaped container 47, to release a predetermined proportionate amount of chlorine or defoamer components therefrom—all of which passes in solution as concentrated detergent solution to the lower collector region 30*b* of the dispenser 21. The "collected" concentrated detergent solution passes by gravity through the discharge port 34 and hose clamp extension 35 into appropriate conduit means or directly into an underlying wash tank reservoir for subsequent use by a washing machine. Besides the errosive action of solution passing from the upper exposed surface 100*a* of the detergent mass 100, the volume of solid detergent contained within the second receptacle-shaped container 47 is further directly dissolved by hydraulic action from the spray projected from the nozzle 61.

While the invention applies to dispenser configurations wherein the nozzle 61 is mounted below the exposed detergent surface, it is generally preferable to position the nozzle 61 in a position overlying the solid detergent block to be dissolved, and to place the exposed surface or surfaces of the solid block detergent at an angle with respect to the horizontal (preferably between 10° and 90°), to supplement the hydraulic dissolution with the errosive dissolution caused by the solution flowing down the exposed surface(s). In the preferred embodiment of the invention disclosed in the Figures, it has been found that an inclination of the exposed detergent surface 100*a* of approximately 60° with the horizontal provides adequate dwell time for the downwardly flowing water, while maintaining a sufficiently small response time for the dispenser (i.e. that elapsed time after which the pressurized spray is projected from the nozzle 61 to the time in which the majority of the concentrated detergent solution produced thereby passes in solution out of the discharge port 34).

The first lower wall 21*c* of the dispenser 21, as well as the upper and lower peripheral side wall portions 44*a* and 42*a* of the cartridge member 40 are inclined slightly with respect to the horizontal (when the dispenser and enclosed cartridge member 40 are mounted in operative position), to insure drainage of any liquid solutions (either the projected spray or resultant concentrated detergent solution) therefrom. Any liquid coming in contact with these surfaces is directed toward the collector region 30*b* of the cavity 30.

Whenever the charge of solid detergent contained within the various receptacles of the cartridge member 40 are depicted, the cartridge is rapidly replaced by slidably removing the spent cartridge from the inner cavity 30, through the access port 32, and simply replacing the spent cartridge with a fully charged cartridge member 40. As previously discussed, the disposable cartridge which could be physically re-charged before replacement thereof into the housing 21. In such a re-usable cartidge application, it would be desirable to wrap the highly caustic detergent block being placed within the cartridge with a water soluble covering such as polyvinylalcohol to protect the hands of the person handling the solid detergent block used to charge the cartridge. Alternatively, the cartridge member 40 could be replaced by an appropriate retaining means forming an integral part of the housing 21 and having appropriate receptacle retaining means for retainably holding charges of solid block detergent in the required predetermined position with respect to the nozzle spray pattern.

While the cartridge member 40 disclosed in the Figures illustrates a cartridge which is completely insertable within the inner cavity 30 of the housing 21, other dispenser housing configurations could be employed within the scope of this invention, wherein the access port 32 would comprise a void or hole within one or more walls of the housing 21 and wherein the cartridge member would be configured as an integral part of the housing proper, such that when properly clamped or fastened in place, the cartridge member 40 itself, when properly positioned in its pre-determined fixed resting position, prevents hazardous spray from the nozzle 61 out of the access port 32, alternate configurations of a dispenser apparatus constructed according to the principles of this invention could employ door or auxiliary closure means for the access port 12. It is also possible to configure such dispensing systems wherein the access and discharge ports 32 and 34 respectively could in fact comprise the same openings, for example in a "bottom loading" dispenser apparatus. It will also be understood and will be apparent to those skilled in the art that while the preferred embodiment of the invention has been generally described in reference to spray washing machines, the concept is equally adaptable to soaker-type machines as well as fabric washing machines.

From the foregoing description, it will be appreciated that the present invention solves many of the problems or deficiencies with prior art detergent dispensers. The dispenser of this invention is particularly suitable for efficiently and safely dispensing generally incompatible detergent compositions in a manner that provides uniformity in detergent concentration over the entire charge of detergent held by the dispenser. Usage of solid detergent in the block form eliminates or minimizes the handling, segregation, misuse, safety and other problems associated with the use and dispensing of liquid detergents and solid detergents in powdered form. The replaceable and disposable cartridge techniques of loading the dispenser further simplifies its use and provides an added dimension of safety.

Other modifications of the invention will be apparent to those skilled in the art in light of the foregoing description. This description is intended to provide specific examples of individual embodiments clearly disclosed in the present invention. Accordingly, the invention is not limited to the described embodiments, or to the use of specific elements therein. All alternative modifications and variations of the present invention which fall within the spirit and broad scope of the appended claims are covered.

We claim:

1. A dispenser for safely handling and dispensing solid block detergent compositions, comprising:

(a) a housing configured for fixed mounting to a solid surface, said housing defining a substantially enclosed inner cavity and access and discharge ports opening into said cavity;

(b) detergent containing cartridge means for providing safe operator handling of highly caustic solid block detergents, comprising:

(i) a geometrically shaped solid block of highly caustic detergent;

(ii) means for fixedly containing said detergent block, so as to expose for use at least one broad surface of said block, positioned and dimensioned to enable an operator to readily and safely grasp and move said detergent block in loading and unloading manner without touching said detergent or residue formed therefrom; and (iii) said detergent block and container means combination being dimensioned for rapid convenient insertion into said inner cavity;

(c) spray-forming nozzle means mounted to extend into said cavity for directing a pressurized fine spray of liquid; and (d) cartridge positioning means in said housing for accepting said cartridge means inserted through said access port and for releasably holding said inserted cartridge means in fixed predetermined position within said cavity in a manner directly and continuously exposing said broad detergent surface to said nozzle spray sufficiently so that the hydraulic action of said nozzle directed spray safely dissolves said detergent block through said exposed detergent surface in uniform controlled manner, forming a concentrated detergent solution for passage through said discharge port.

2. A dispenser for solid block detergent as recited in claim 1, wherein said cartridge positioning means includes guide means within said housing for guiding said cartridge means received through said access port, to said fixed predetermined position within said cavity.

3. A dispenser for solid block detergent as recited in claim 2, wherein said cartridge means comprises a receptacle-shaped container configured to retainably hold said volume of solid block detergent composition, and wherein said guide means is configured to cooperatively slidably engage said receptacle-shaped container for guiding said container into said fixed predetermined position within said cavity.

4. A dispenser for solid block detergent as recited in claim 2, wherein said access port opens into the upper portion of said cavity, and wherein said guide means cooperatively slidably engages said cartridge means received through said access port, such that said guide means slidably directs the lowering of said cartridge means into said fixed predetermined position within said cavity.

5. A dispenser for solid block detergent as recited in claim 1, wherein said housing is mounted in operative position to a solid surface, said cartridge positioning means cooperatively engages said cartridge means at said fixed predetermined position, such that said exposed surface of said retainably held detergent composition faces generally in the upward direction.

6. A dispenser for solid block detergent as recited in claim 5, wherein said exposed detergent surface is generally planar and wherein said cartridge positioning means maintains said exposed surface, measured with respect to a vertical axis, at a predetermined angle ranging between 0 degrees and 90 degrees.

7. A dispenser for solid block detergent as recited in claim 5, wherein said exposed detergent surface is generally planar, wherein said nozzle means projects said spray generally uniformly about a longitudinal spray axis, and wherein said nozzle means is mounted such that said longitudinal spray axis is generally perpendicular to the general plane of said exposed surface.

8. A dispenser for solid block detergent as recited in claim 1, wherein said cartridge means comprises a receptacle-shaped container configured to retainably hold said volume of solid block detergent composition.

9. A dispenser for solid block detergent as recited om claim 8, wherein said retainably held solid block detergent composition has a peripheral shape substantially the same as that of the receptacle-shaped container.

10. A dispenser for solid block detergent as recited in calim 8, wherein at least a portion of said retainably held solid block detergent composition is of the solid cast detergent type, and wherein at least a portion of said receptacle-shaped container comprises a mold which was used to form said solid cast detergent.

11. A dispenser for solid block detergent as recited in claim 10, wherein said mold surrounds and is in contact with said solid cast detergent composition on all surfaces except said exposed surface thereof.

12. A dispenser for solid block detergent as recited in claim 8, wherein said receptacle-shaped container comprises a plurality of distinct chambers each suitable for retainably holding and maintaining in fixed position relative thereto a geometrically shaped volume of solid block detergent composition, so as to expose one surface each of said respective volumes of said block detergent composition, and wherein said nozzle means simultaneously directs said pressurized spray at substantially the entire said exposed surfaces of each of said respective volumes of said solid block detergent.

13. A dispenser for solid block detergent as recited in claim 12, wherein at least two of said plurality of said chambers have separating walls which are contiguous with one another.

14. A dispenser for solid block detergent as recited in claim 8, wherein said cartridge means further includes a second receptacle-shaped container suitable for retainably holding at least one three-dimension solid block detergent composition comprising a source of available chlorine.

15. A dispenser for solid block detergent as recited in claim 8, wherein said cartridge means further includes a second receptacle-shaped container suitable for retainably holding at least one three-dimensional solid block detergent composition comprising a defoamer.

16. A dispenser for solid block detergent as recited in claim 14 or 15, wherein said nozzle means is mounted to further direct said pressurized spray at said retainably held solid block detergent composition within said second receptacle-shaped container.

17. A dispenser for solid block detergent as recited in claim 14 or 15, wherein when said housing is mounted in operative position to a solid surface, said cartridge positioning means cooperatively engages and maintains said cartridge means at said fixed predetermined position such that said exposed surface of said block detergent composition retainably held by said first recited receptacle-shaped container faces generally in the upward direction and is positioned at a fixed predetermined angle measured with respect to a horizontal axis between 0 and 90 degrees; and wherein said second recited receptacle-shaped container is operatively disposed at a position relatively lower than that of said first recited receptacle-shaped container.

18. A dispenser for solid block detergent as recited in claim 8, wherein said cartridge means further includes a second receptacle-shaped container, suitable for retainably holding with respect thereto a second solid volume of block detergent composition; and wherein said first and said second receptacle-shaped containers are contiguous with one another and are separated by a porous wall member which enables generally unimpeded fluid flow therethrough.

19. A dispenser for solid block detergent as recited in claim 8, wherein said receptacle-shaped container comprises a removably disposable item.

20. A dispenser for solid block detergent as recited in claim 8, wherein said receptacle-shaped container includes means for preventing accumulation of liquid within said receptacle-shaped container when said detergent cartridge means is operatively disposed in said fixed predetermined position with respect to said housing.

21. A dispenser for solid block detergent as recited in claim 20, wherein said liquid accumulation preventing means comprises a wall member defining one retaining side of said receptacle-shaped container, said wall member being configured in cooperation with said receptacle-shaped container such that when said detergent cartridge means is operatively disposed in said fixed predetermined position with respect to said housing, said wall member defines a fluid flow path from the lowermost disposal portion of said receptacle-shaped container.

22. A dispenser for solid block detergent as recited in claim 1, including closure means cooperatively disposed with respect to said housing for substantially closing said access port to prevent spray therethrough, from said inner cavity.

23. A dispenser for solid block detergent as recited in claim 22, wherein said cartridge means is configured to cooperatively matingly engage said housing at said access port thereof, such that when said cartridge means is disposed in said fixed predetermined position with respect to said housing, said cartridge means effectively blocks spray through said access port from said inner cavity.

24. A dispenser for solid block detergent as recited in claim 22, further including valve means cooperatively connected with said spray nozzle means for selectively blocking pressurized fluid flow to said nozzle means in response to received energization commands, and safety switching means cooperatively connected with said valve means for sensing the closure status of said access port and for providing said energization commands to said valve means in response thereto so as to direct said valve means to block fluid flow to said nozzle means whenever said access port is open to said inner cavity.

25. A dispenser for said block detergent as recited in claim 24, wherein said safety switching means comprises means cooperatively disposed to sense the relative position of said cartridge means within said inner cavity for providing said energization commands to said valve means to block fluid flow to said nozzle means whenever said cartridge means is not operatively disposed in said fixed predetermined position within said inner cavity.

* * * * *